United States Patent [19]
Bruder

[11] Patent Number: 5,644,660
[45] Date of Patent: Jul. 1, 1997

[54] METHOD AND APPARATUS FOR EFFICIENTLY TRANSMITTING FORCED UPDATES IN A MOVING PICTURE CODEC

[75] Inventor: John E. Bruder, Arlington, Mass.

[73] Assignee: PictureTel Corporation, Andover, Mass.

[21] Appl. No.: 865,319

[22] Filed: Apr. 9, 1992

[51] Int. Cl.$^6$ ..................................................... G06K 9/36
[52] U.S. Cl. ............................................ 382/232; 382/236
[58] Field of Search ........................... 382/56, 232, 236; 358/135, 136; 348/397, 400, 409, 415–416; H04N 7/12

[56] References Cited

U.S. PATENT DOCUMENTS

| | | | |
|---|---|---|---|
| 4,827,338 | 5/1989 | Gerard | 358/135 |
| 4,837,618 | 6/1989 | Hatori et al. | 358/135 |
| 4,942,465 | 7/1990 | Ohta | 358/135 |
| 4,947,248 | 8/1990 | Hienerwadel et al. | 358/135 |
| 5,057,918 | 10/1991 | Denoyelle | 358/135 |

*Primary Examiner*—Yon J. Couso
*Attorney, Agent, or Firm*—Fish & Richardson P.C.

[57] ABSTRACT

A method and apparatus for selecting blocks for intraframe encoding in a way which avoids intraframe encoding blocks which have not diverged. An inter-energy value is calculated which represents the approximate number of bits required to encode the block of data using a best interframe encoding technique. An intra-energy value is calculated which represents the approximate number of bits required to encode the block of data using intraframe encoding. The block is transmitted using intraframe encoding if the intra-energy is approximately less than the inter-energy. Otherwise, the block is either a) transmitted using an interframe encoding technique or b) not transmitted, thereby implying that the block from the previous frame in the sequence should be repeated. An encoder determines the number of times K that the block has been interframe encoded since it was last intraframe encoded. A weighting factor w(K) is calculated which decreases with the value of K. A weighted energy value is then calculated by multiplying the intra-energy plus an offset S by the weighting factor w(k). If the weighted energy value is approximately less than the inter-energy value, the block is transmitted using intraframe encoding.

15 Claims, 4 Drawing Sheets

METHOD AND APPARATUS FOR EFFICIENTLY TRANSMITTING FORCED UPDATES IN A MOVING PICTURE CODEC

BACKGROUND OF THE INVENTION

The invention relates to processing block coded image data. The Consultative Committee for International Telephony and Telegraph (CCITT) has adopted a standard (H.261) for encoding image data representative of a sequence of two dimensional arrays of image data. According to the proposed standard, a two dimensional array of pixel data is divided into a plurality of macroblocks, each macroblock (herein "macroblock" or "block") including an 16×16 sub-array. Each block of data is encoded using a lossy encoding technique to reduce the number of bits required to represent the block. The encoded data is then transmitted to a remote device which reconstructs the entire image from the transmitted data.

The transmitter is typically capable of encoding the block of data using a variety of encoding techniques. For each block of data, the transmitter selects an encoding technique which requires the fewest number of bits to describe the block of data.

One class of such techniques is referred to as "interframe" encoding. Interframe encoding techniques define each block of image data in terms of the differences between the block of data and a reference block of data stored both at the transmitter and the receiver device. The transmitter simply transmits to the receiver device the differences between the block to be transmitted and the selected reference image.

The transmitter may alternatively choose to encode the block of data using "intraframe" encoding. According to this technique, the transmitter encodes the original block in its entirety, without reference to other data. In effect, intraframe encoding describes each block of data in terms of the differences between the block of data and a zero reference block in which each pixel is set to the value zero.

Intraframe encoding typically requires many more bits to represent the block. Therefore, interframe encoding is generally preferred. However, as explained more fully below, if a given block in a sequence of frames is repeatedly transmitted using interframe encoding, the reference image block maintained at the receiver tends to diverge over time from the corresponding reference block stored at the transmitter. Accordingly, when the transmitter encodes a block relative to a given reference, the block reconstructed by the receiver will differ from the block intended by the transmitter.

In recognition of this problem, the CCITT's proposed standard requires that each block of data be coded in intraframe mode at least once for every 132 times that the block is coded in interframe mode. To meet this requirement, transmitters typically select three blocks from each frame for transmission using intraframe encoding. For example, the blocks in each frame are arranged in a raster scan ordering. The transmitter first selects the first three blocks from the raster scan sequence for transmission using intraframe encoding. For the next frame, the transmitter selects the next three blocks in the raster scan sequence. This process is repeated for each set of three blocks in the raster sequence until the end of the raster sequence is reached. The transmitter then repeats the process starting with the first three blocks of the raster sequence.

One object of the invention is to select blocks for intraframe encoding in a way which avoids intraframe encoding blocks which have not diverged.

SUMMARY OF THE INVENTION

In general, the invention relates to a method and apparatus for selecting, from a plurality of coding techniques, an efficient coding technique for representing a block of data in each of a sequence of frames. More specifically, the invention relates to selecting blocks for intraframe encoding in a way which avoids intraframe encoding blocks which have not diverged.

Toward this end, an inter-energy value is calculated which represents the approximate number of bits required to encode the block of data using a best interframe encoding technique. An intra-energy value is calculated which represents the approximate number of bits required to encode the block of data using intraframe encoding. If the intra-energy is approximately less than the inter-energy, the block is transmitted using intraframe encoding. Otherwise, the block is either a) transmitted using the best interframe encoding technique or b) not transmitted, thereby implying the block from the previous frame in the sequence should be repeated.

In preferred embodiments, an encoder determines the number of times K that the block has been interframe encoded since it was last intraframe encoded. A weighting factor w(K) is calculated which decreases with the value of K. A weighted energy value is then calculated by multiplying the intra-energy by the weighting factor w(k). If the weighted energy value is approximately less than the inter-energy value, the block is transmitted using intraframe encoding. This technique discourages intraframe encoding a block if interframe encoding can represent the block efficiently. However, since the accuracy of interframe encoding can degrade if repeatedly performed, this technique tends to prefer intraframe encoding if interframe encoding has been used frequently since the last intraframe transmission.

Other objects, features and advantages of the invention are apparent from the following description of particular preferred embodiments taken together with the drawings.

DESCRIPTION OF THE PREFERRED EMBODIMENTS

Figure 1:
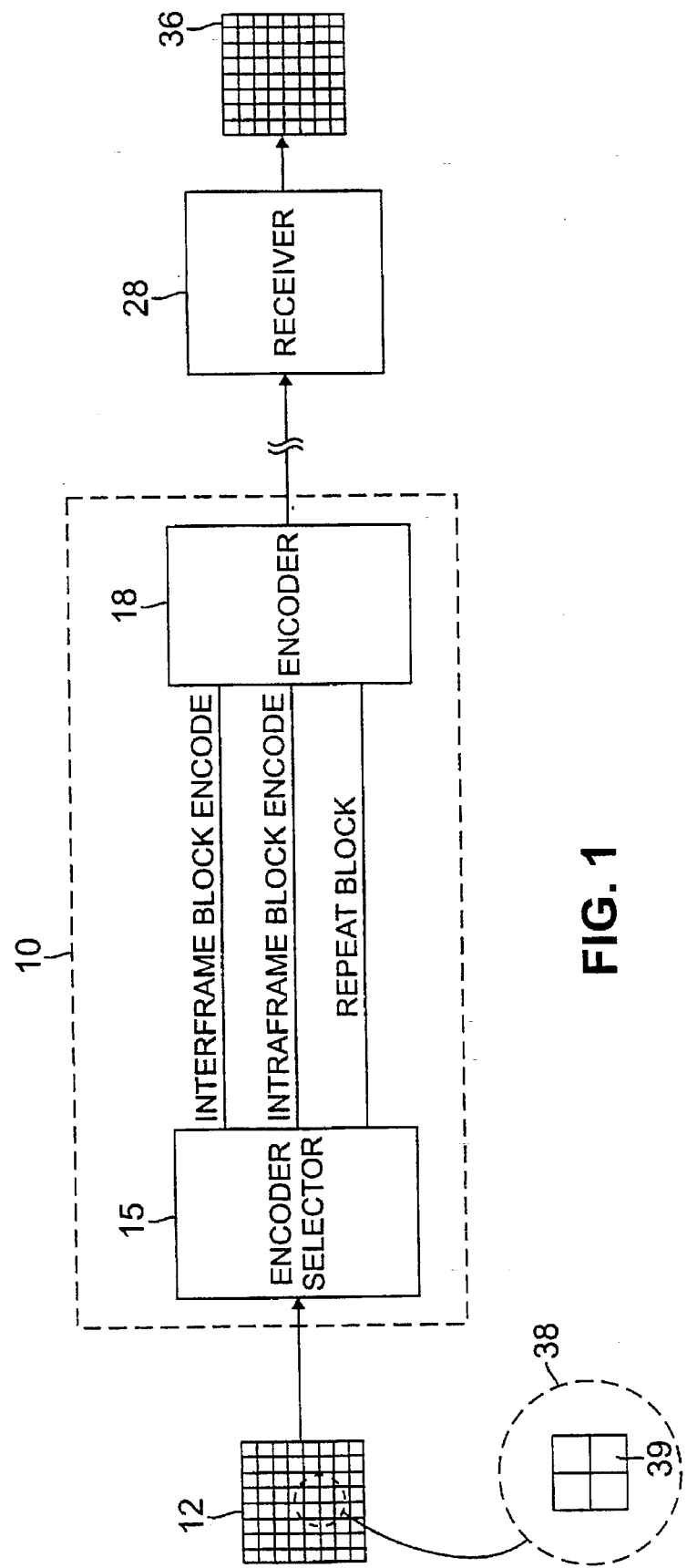
FIG. 1 is a block diagram of a transmitter for encoding image data using a block encoder and a receiver for decoding image data received from the transmitter.

Referring to FIG. 1, a transmitter 10 encodes image data representative of an image 12 and transmits the encoded image data to a receiver 28 which reconstructs the image and displays it at a remote location. Image 12 consists of luminance and chroma components. However, for purposes of the following discussion, only the luminance component is described.

The transmitter 10 separates the image into an array of macroblocks 38 wherein each macroblock includes a 16×16 sub-array of pixel data. Each macroblock is further divided into four blocks 39 each including an 8×8 subarray of pixel data.

The transmitter is typically capable of encoding each block of data using a variety of encoding techniques. For each macroblock of data, the transmitter selects an encoding technique which requires the fewest number of bits to describe the macroblock of data.

One class of such techniques is referred to as "interframe" encoding. Interframe encoding techniques define each block of image data in terms of the differences between the block of data and a reference block of data. The transmitter transmits the difference information to the receiver. Since the receiver maintains copies of the references images, it can reconstruct the block of data by combining the difference information with the reference image. Such interframe encoding techniques are well known to those skilled in the art.

Another technique is referred to as "intraframe" encoding. According to this technique, the transmitter simply transmits the original block of data to the receiver. In effect, intraframe encoding describes each block of data in terms of the differences between the block of data and a zeroed reference block in which each pixel equals zero.

Finally, the transmitter may send no information regarding the block of data. This implies to the receiver that the corresponding block for the last frame should be used as the block for the current frame.

For each macroblock, an encode selector 15 determines whether to a) transmit the macroblock using interframe encoding, b) transmit the macroblock using intraframe encoding, or c) send no information regarding the block, thereby instructing the receiver to repeat the same block from the previous frame. Based on that selection, an encoder 18 prepares an appropriate transmission signal, if any, which describes the macroblock using the selected form of encoding.

Figure 2A:
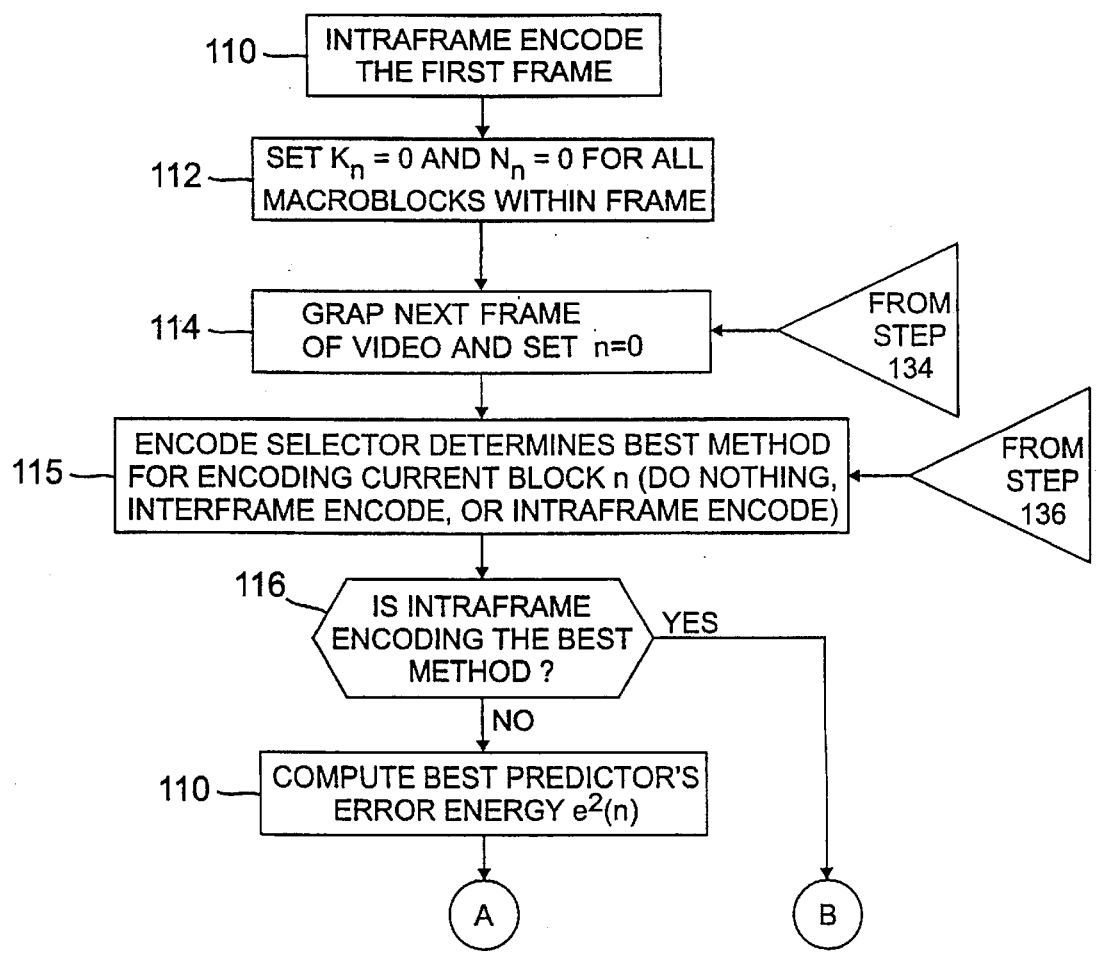
FIGS. 2(a), 2(b) and 2(c) are a flow chart illustrating a procedure for determining when to encode a block of data using intraframe encoding.
Figure 2B:
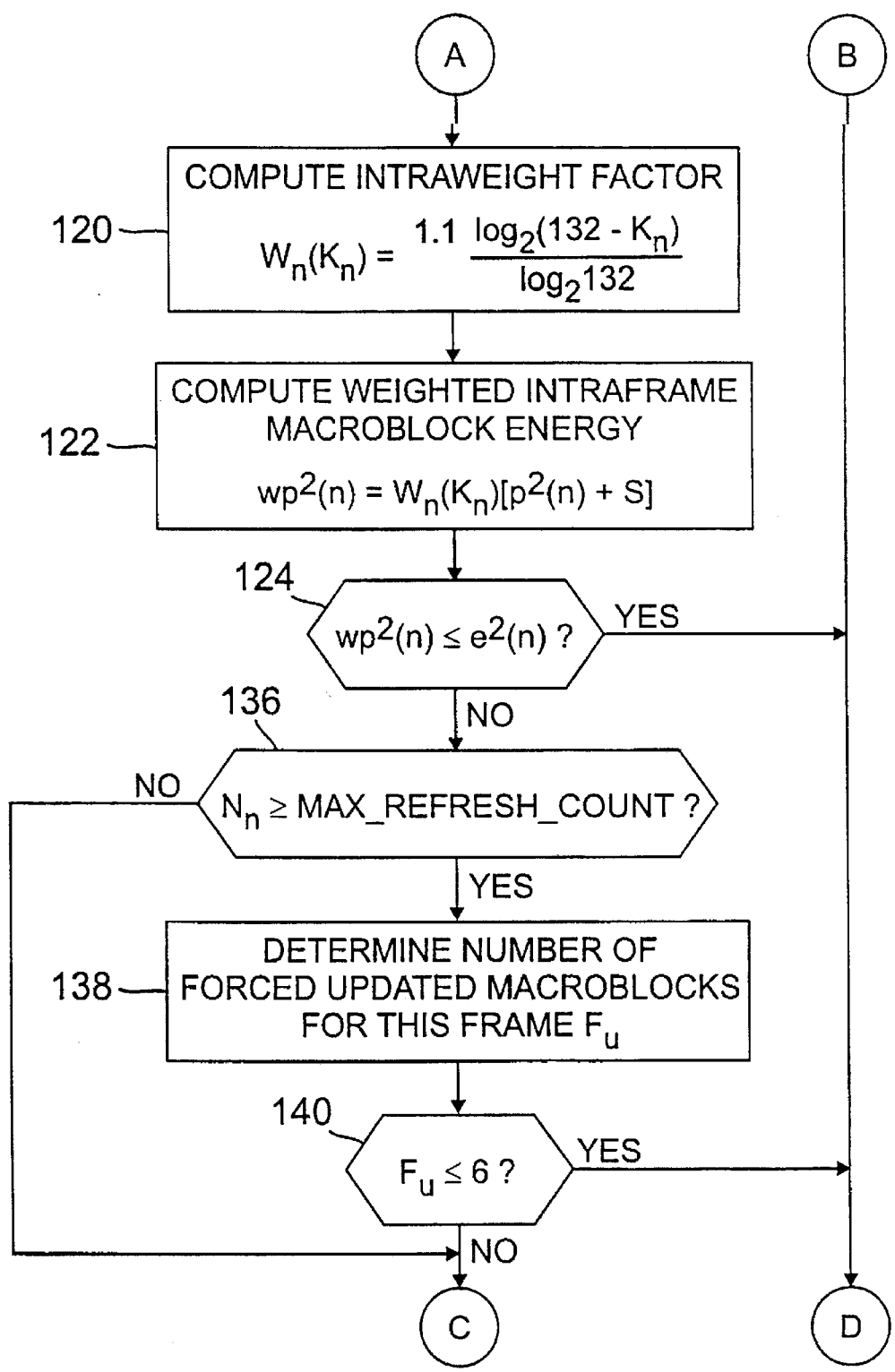
Figure 2C:
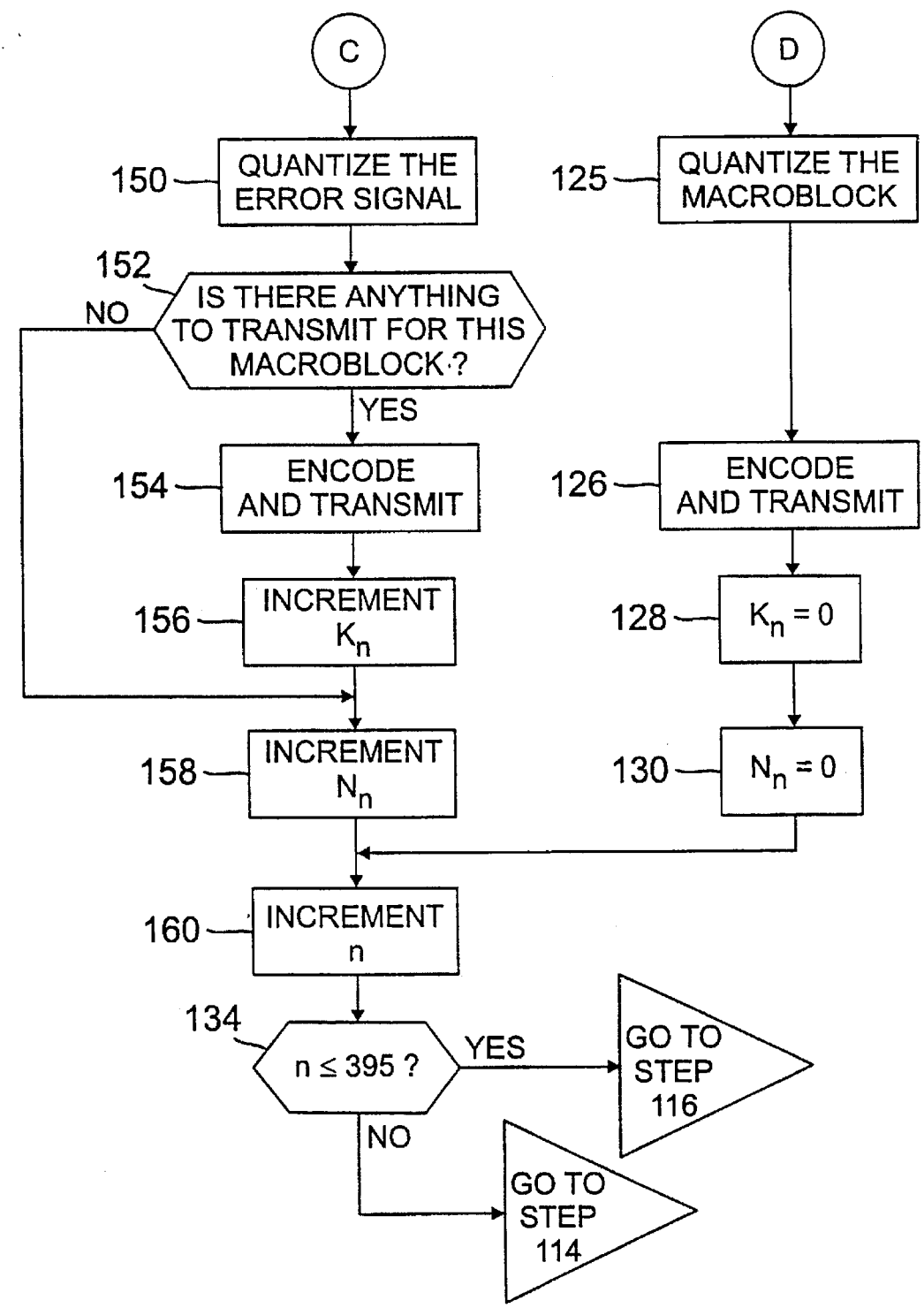

Referring to FIGS. 2(a)–2(c), the following describes the operation of encode selector 15 within the transmitter. Since no image data is transmitted prior to the first frame, neither the receiver nor transmitter have reference images for use in interframe encoding. Accordingly, for the first frame of the video sequence, the encode selector selects intraframe encoding for each macroblock of the first frame. (Step 110). The selector next initializes an array of count variables $K_n$ and $N_n$ to zero, where n is an integer identifying one of 396 macroblocks within a frame. (Step 112). As explained more fully below, $K_n$ is a count variable whose value represents the number of times the macroblock n has been interframe encoded since its last intraframe encoding. The count $N_n$ represents the number of frames since the macroblock n was last coded using intraframe encoding. In other words, if a given block is simply repeated, without the use of interframe or intraframe encoding, the count $N_n$ is incremented but the count $K_n$ is not.

After sending the first frame, the encode selector begins encoding each block of the next frame starting with the block n=0. (Step 114). The encode selector 15 determines the best method for encoding the macroblock. (Step 115). This may be to do nothing (i.e., block repeat), use some form of filtered or unfiltered motion compensation, or intraframe encode the macroblock. As explained more fully below, this decision may be modified to force intraframe encoding. If the encode selector determines that intraframe is the preferred coding, the macroblock is quantized, encoded and transmitted (Steps 116, 125, 126) and both counters $K_n$ and $N_n$ are reset to zero. (Steps 128 and 130).

If the encode selector determines some method other than intraframe is the preferred encoding, we may wish to force intraframe encoding to prevent divergence due to numerical inaccuracy or transmission error. Toward this end, the encode selector computes the energy of the error caused by the macroblock's best predictor, $e^2(n)$. (Step 118). For example, this might be a frame difference or a motion compensation error, with or without loop filtering. The encode selector also calculates an intraweight factor $W_n(K_n)$ according to the equation below. (Step 120):

$$W_n(K_n) = \frac{1.1 \log_2 (132 - K_n)}{\log_2 132}$$

Note that this weight starts at 1.1 for $K_n=0$ and falls to zero when $K_n=131$. It then computes the weighted intraframe macroblock energy $wp^2(n)$ using the equation below:

$$wp^2(n) = W_n(K_n)[p^2(n)+S]$$

where $p^2(n)$ equals the variance of the macroblock luminance pixels and S is a constant. (Step 122). The factor S compensates for the bits needed to transmit the macroblock's mean value.

The encode selector compares the weighted intrablock energy $wp^2(n)$ to the best predictor's error energy. (Step 124). If the weighted energy is less, the encode selector selects intraframe coding as the preferred technique for encoding the macroblock. As $K_n$ approaches 131, the likelihood of selecting intraframe encoding increases, becoming certain when $K_n=131$, i.e., when the macroblock would have been interframe encoded for the 132nd time. The macroblock is intraframe quantized, encoded and transmitted in Steps 125–126.

Since the macroblock has now been intraframe encoded, the encode selector resets the counts $K_n$ and $N_n$ to zero. (Steps 128, 130). It then increments the count n to select the next macroblock in the frame. (Step 160). If the count n is less than or equal to 395, the encode selector begins the above described cycle for the next macroblock n. (Steps 134, 116). Otherwise, it begins processing the next frame. (Steps 134, 114).

Returning to Step 124, if the interframe encoding energy $e^2(n)$ is less than the weighted energy $wp^2(n)$, the encode selector compares the count $N_n$ to a max-refresh-count. (Step 136). In the preferred embodiment, the max-refresh-count is determined by the video rate R. For video rates of 128 kilobits per second or less, the max-refresh-count is set equal to 1,200. For video rates between 128 kilobits and 256 kilobits, the max-refresh-count is set equal to 800. Finally, for video rates between 256 and 384 kilobits per second, the max-refresh-count is set to 400.

As explained more fully below, if $N_n$ is greater than or equal to the max-refresh-count, the encode selector will attempt to send the block using intraframe coding despite the fact that interframe coding appears to be the more efficient representation of the block. For purposes of the following discussion, this procedure is referred to as a "forced" update. This procedure is intended to compensate for transmission line errors. For example, if a transmission failure occurs, the receiver never receives the transmitter's instructions on how to prepare the block. The transmitter, unaware that the receiver did not receive its instructions, proceeds to update its copy of the reconstructed block according to its own transmission signal. The receiver meanwhile uses other data. Accordingly, a line error can cause the reference images used by the receiver and transmitter to quickly diverge.

It is also possible the receiver may not fully receive the very first frame of video transmitted. Until the transmitter intraframe updates all macroblocks in the picture, the received picture will contain erroneous information. For these and other reasons, it is important the transmitter makes sure that eventually all macroblocks are force updated. Since intraframe encoded macroblocks expend many bits, we limit the number of forced updates per frame. In the preferred embodiment, the limit is six.

Accordingly, if $N_n$ is greater than or equal to max-refresh-count, (Step 136) the encode selector first determines the number of blocks which have been force updated in the current frame. (Step 138). If the number of forced updates exceeds a limit, (i.e., 6 in the preferred embodiment) the encode selector chooses not to send the block using intraframe coding at this time. (Step 140,142). This procedure limits the number of forced updates in a given frame. If the number of forced updates is below the threshold, the encode selector sends the block using intraframe encoding and resets the counters $K_n$ and $N_n$ to zero. (Steps 125, 126,128, 130).

Referring again to Step 136, if $N_n$ is below the threshold max-refresh-count, the encoder attempts to quantize the prediction error signal. (Step 150). It is possible the result of this step is that there is no information to transmit for this macroblock, i.e., the receiver will simply repeat the corresponding macroblock from the previous frame. In this case, counter $K_n$ is not incremented. (Step 152). Otherwise, the quantizer output together with any other side information is encoded and transmitted and counter $K_n$ incremented. (Steps 154, 156). Counter $N_n$ is incremented in either case, indicating that this macroblock was not intraframe encoded. (Step 158). Thus, $K_n$ and $N_n$ differ by the number of times macroblock n has been repeated since its last intraframe encoding. Steps 160 and 134 increment macroblock counter n and the process is repeated for all macroblocks in the frame.

Thus, according to the above described procedure the encode selector decides whether to transmit a given block using intraframe encoding based on the accuracy of the interframe encoding techniques. If the interframe encoding techniques represent the block very efficiently, the encode selector chooses to transmit the frame using interframe encoding. As time passes since the block was last encoded using intraframe encoding, the encode selector begins to bias this decision in favor of intraframe encoding. More specifically, with each interframe update, the macroblock's intraweight factor $W_n(K_n)$ decreases. Eventually, the weighting factor is sufficiently close to zero that the encode selector chooses to transmit the block of data using intraframe encoding in favor of other interframe encoding techniques. This procedure insures that the decision to send a macroblock intraframe is driven by the number of interframe encodings ($K_n$), and the number of frames ($N_n$) which have been sent. More specifically, after a block is transmitted using intraframe encoding, the reference blocks at the transmitter and receiver should be identical except for the numerical mismatch of a single intraframe decode operation. As time passes, the references may begin to drift from each other. Accordingly, the encode selector may gradually decrease the intraweight factor to bias the decision in favor of intraframe encoding.

Additions, subtractions, deletions and other modifications of the preferred particular embodiments of the inventions will be apparent to those practiced in the art and are within the scope of the following claims.

What is claimed is:

1. A method for encoding and transmitting a block of data in each of a sequence of frames, the method comprising the steps of:

calculating a first energy value representative of the approximate number of bits required to encode said block of data using an interframe encoding technique, calculating a second energy value representative of the approximate number of bits required to encode the block of data using intraframe encoding, and transmitting said block using intraframe encoding if said second energy value is approximately less than said first energy value.

2. A method for encoding and transmitting a block of data in each of a sequence of frames, the method comprising the steps of:

determining the number of frames k in which said block was interframe encoded since said block was last encoded using intraframe encoding, calculating a first energy value representative of the approximate number of bits required to encode said block of data using an interframe encoding technique, calculating a second energy value representative of the approximate number of bits required to encode the block of data using intraframe encoding, calculating a weighting factor w(k) that decreases with increasing value of k, calculating a weighted energy value by multiplying said second energy by said weighting factor w(k), and transmitting said block using intraframe encoding if said weighted energy value is approximately less than said first energy value.

3. A method for encoding and transmitting a sequence of frames of data, each frame of said sequence conforming to a frame format divided into a plurality of blocks, the method comprising the steps of:

(a) providing an array of counters, each counter of said array corresponding to a block of said frame format;

(b) for each block of each frame, if the corresponding counter is greater than a threshold determined for said block, transmitting said block using intraframe coding and restarting said corresponding counter; and (c) for blocks of a frame not selected for intraframe coding, incrementing the corresponding counters.

4. The method of claim 3 further comprising the step of:

within each frame transmitted, limiting to a predetermined maximum the number of blocks selected in step (b) for intraframe coding.

5. The method of claim 3 wherein said threshold is a constant for all blocks of all frames of said sequence.

6. The method of claim 5 wherein said constant is selected at the beginning of the transmission of said sequence of frames, the value of said selected constant being inversely related to the data rate of transmission of said sequence of frames.

7. The method of claim 5 wherein a counter of said array counts all frames transmitted since the corresponding block was last encoded using intraframe encoding.

8. The method of claim 3 wherein a counter of said array counts all frames transmitted since the corresponding block was last encoded using intraframe encoding.

9. The method of claim 3 wherein the transmitting of step (b) further comprises the steps of:

calculating a first energy value representative of the approximate number of bits required to encode said block using an interframe encoding technique;

calculating a second energy value representative of the approximate number of bits required to encode said block using an intraframe encoding technique;

calculating a weighting factor that decreases with increase in the value of the counter corresponding to said block;

calculating a weighted energy value by multiplying said second energy value by said weighting factor; and selecting intraframe coding to transmit said block if said weighted energy value is approximately less than said first energy value.

10. The method of claim 9 wherein said weighting factor decreases approximately logarithmically with increase in said corresponding counter.

11. The method of claim 9 wherein said corresponding counter omits counting those frames in which said block was encoded as having no change from the previous frame.

12. The method of claim 3 wherein said corresponding counter omits counting those frames in which said block was encoded as having no change from the previous frame.

13. A method for encoding and transmitting a block of data in each of a sequence of frames, the method comprising the steps of:

(a) selecting at the beginning of the transmission of said sequence a constant first threshold, the value of said first threshold being inversely related to the data rate of transmission of said sequence of frames;

(b) determining as a first aging count, a count of all frames transmitted since said block was last encoded using intraframe coding;

(c) determining as a second aging count, a count of the number of frames in which said frame has been encoded using an interframe encoding method since said block was last encoded using intraframe coding;

(d) calculating a first energy value representative of the approximate number of bits required to encode said block of data using an interframe encoding technique;

(e) calculating a second energy value representative of the approximate number of bits required to encode said block of data using an intraframe encoding technique;

(f) calculating a weighting factor that decreases with increase in said second aging count;

(g) calculating a weighted energy value by multiplying said second energy value by said weighting factor; and (h) transmitting said block using intraframe coding if said first aging count is greater than said first threshold or said weighted energy value is approximately less than said first energy value.

14. The method of claim 13 wherein said weighting factor decreases approximately logarithmically with increase in said aging count.

15. An apparatus for encoding and transmitting a block of data in each of a sequence of frames, each frame of said sequence conforming to a frame format divided into a plurality of blocks, the apparatus comprising:

an array of counters, each counter of said array corresponding to a block of said frame format and having a value counting a number of frames transmitted since an intraframe encoding of said block was last transmitted;

an intraframe encoder for encoding said block using an intraframe coding method to produce an intraframe encoding;

an interframe encoder for encoding said block using an interframe coding method to produce an interframe encoding;

a selector responsive to said counters, that selects said intraframe encoding for transmission if the corresponding counter is greater than a threshold determined for said block, and restarts said corresponding counter, and selects said interframe encoding only if said corresponding counter is less than or equal to said threshold;

an incrementer, for incrementing said counters, and responsive to said selector, that increments said corresponding counter only if said selector does not select intraframe encoding for transmission of said block; and a transmitter that transmits a said block in said selected encoding.

* * * * *